United States Patent
Saito et al.

(10) Patent No.: US 6,836,278 B2
(45) Date of Patent: Dec. 28, 2004

(54) OPTICAL SCANNING APPARATUS USING A PLURALITY OF LASER BEAMS

(75) Inventors: Susumu Saito, Ibaraki (JP); Junshin Sakamoto, Ibaraki (JP); Takeshi Mochizuki, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 84 days.

(21) Appl. No.: 09/810,217

(22) Filed: Mar. 19, 2001

(65) Prior Publication Data

US 2001/0035999 A1 Nov. 1, 2001

(30) Foreign Application Priority Data

Mar. 17, 2000 (JP) .................................... P2000-075111
Mar. 17, 2000 (JP) .................................... P2000-075112

(51) Int. Cl.[7] ............................ B41J 2/455; B41J 2/435
(52) U.S. Cl. ...................................... 347/233; 347/237
(58) Field of Search ................................ 347/233, 234, 347/235, 237, 238, 247, 248, 250, 256, 240; 250/208.1, 208.2, 234; 359/821; 437/238

(56) References Cited

U.S. PATENT DOCUMENTS

| | | | | |
|---|---|---|---|---|
| 4,393,387 A | * | 7/1983 | Kitamura | 347/240 |
| 4,806,951 A | * | 2/1989 | Arimoto et al. | 347/235 |
| 5,539,719 A | * | 7/1996 | Motoi | 250/208.1 |
| 5,999,345 A | * | 12/1999 | Nakajima et al. | 359/821 |
| 6,133,566 A | * | 10/2000 | Yamaguchi | 250/234 |
| 6,522,350 B2 | * | 2/2003 | Inoue et al. | 347/238 |

FOREIGN PATENT DOCUMENTS

JP 10-142539 * 5/1998 ............ B41J/2/44

* cited by examiner

*Primary Examiner*—Hai Pham
(74) *Attorney, Agent, or Firm*—Sughrue Mion, PLLC

(57) ABSTRACT

In a simultaneous multibeam scanning system, composite beams are formed by using two semiconductor laser arrays each of which can singly output a plurality of beams. An optical system is enabled to scan beams of the number, which corresponds to the sum total of output beams of each of laser light sources, in a scanning plane. A stabilization control means for maintaining the interval between adjacent scanning beams at a uniform value is introduced into this optical system.

6 Claims, 10 Drawing Sheets

$\theta = \sin^{-1}[p/md]$

OPTICAL SCANNING APPARATUS USING A PLURALITY OF LASER BEAMS

BACKGROUND OF THE INVENTION

1. Field of the Invention

The present invention relates to an optical scanning apparatus, suited to high print dot density printing, for performing parallel scan by simultaneously using a large number of laser beams that can be modulated independent of one another.

2. Description of the Related Art

It has been well known that a simultaneous and parallel scanning system using a plurality of beams is effective as means for managing both the increasing of a printing speed and the enhancement of a print dot density in a laser printer adapted to write image information by basically utilizing laser beam scanning. Such a conventional scanning system is, for example, (1) a two-beam scanning system that uses two laser light sources adapted to output a single output light beam and that is enabled to control the interval between the two beams in a scanning surface after the two beams are collectively deflected and caused to scan (see Japanese Patent Application No. 60-86446), (2) a system adapted to split a single beam outputted from a laser light source into a plurality of beams and to use the plurality of beams as scanning beams after each of the beams is passed through a corresponding light modulator and then deflected and used for scanning (see JP-A-53-146644), (3) a system adapted to connect output beams of individual semiconductor lasers to one another by an optical director element and to constitute an array light source by placing output end portions of this optical director element in such a way as to be close to one another (see JP-A-54-7328), (4) a system using an array type semiconductor laser constituted by incorporating a plurality of laser devices, which can be driven independent of one another, into a single semiconductor laser light source (see Japanese Patent Application No. 53-66770), (5) a system that uses two two-element array light sources and has a mechanism for adjusting the positions of the light sources in such a way as to set the interval between adjacent scanning beams at a preset value (see JP-A-3-107910), and (6) an optical system adapted to detect and adjust a beam pitch interval for performing two-beam scanning (see JP-A-9-193465).

When image information is recorded by using a multi-beam scanning optical system, inconsistency in density occurs in the case that the beam interval in a direction perpendicular to the scanning direction shifts from a proper value according to a print dot density. This results in degradation in picture quality of a printed image. Thus, the prior art system (1) performs a servo control method at each beam scan to thereby stabilize the beam interval. It is, however, difficult to apply this prior art system to multibeam scanning in the case that the number of simultaneously used scanning beams is 3 or more. The prior art systems (2) to (4) do not take the stabilization of the interval between adjacent ones of scanning lines into consideration. The prior art system (5) is adapted to detect individual scanning line positions in the case of two-beam scanning in the interval between print jobs and adjust the interval between the scanning lines. This prior art system, however, is unsuitable for the cases that a long-duration continuous operation is needed, and that the number of simultaneously used scanning beams is 3 or more.

In particular, in the above conventional devices (3) and (4) (see JP-A-54-7328 and Japanese Patent Application No. 53-66770), when image information is written by using light sources of such conventional systems and performing parallel scanning thereon with a plurality of beams, inconsistency in density occurs in the case that the value of the beam interval between scanning beams corresponding to a predetermined print dot density is not a prescribed value according to a print dot density. This results in degradation in picture quality of a printed image. A cause of an occurrence of variation in the beam interval is that the position of the array light source portion shifts from a predetermined stationary position owing to change in ambient temperature and to mechanical shock, and that this shift causes variation in angle of arrangement of light source light emitting portions with respect to a main scanning direction of beams.

A countermeasure against this variation in beam interval is a system, in which a CCD line sensor is placed near to a scanning end of the scanning recording medium to thereby detect the position of each of the scanning beams, and in which a beam pitch is adjusted to a set value of the beam interval by rotating the array light source when the beam pitch obtained from the detected positions differs from a currently selected set value of the beam interval as proposed by the above conventional device (6) (see JP-A-9-193465). In this system, the position of a single scanning beam is detected by performing scanning once. Upon completion of measurement of the beams, the beam pitch is detected. Then, the position of the light source is corrected. Further, the detection and correction of this beam pitch are performed before the commencement of a printing job, or during the interval between jobs. According to this system, the pitch intervals between the scanning beams cannot be detected simultaneously with the scanning by using the beams. Thus, the accuracy, with which the beam pitch or interval is detected, is degraded. Moreover, the detection and correction of the beam pitch cannot be performed during operations of a printer. Therefore, this conventional system is unsuitable for a job, the execution of which requires a long time.

SUMMARY OF THE INVENTION

The invention has been made to solve the aforementioned problems, and therefore one object of the present invention is to provide an optical scanning apparatus adapted to detect the interval between scanning lines respectively corresponding to a plurality of beams at each beam scanning without interrupting a printing job, and also adapted to perform a stabilization control operation on the interval between scanning lines so that the interval therebetween stably has a set value, and enabled to be applied to the case that a large quantity of image information is recorded and processed at a high speed and at high resolution.

To solve the foregoing problems, a conventional array type semiconductor laser device shown in FIG. 2 is used as a light source therefor. When this light source is, for instance, an array light source having three laser devices, a plurality of laser devices 91, 92, and 93, which can be modulated independent of one another, are formed on the same substrate 90. The light emitting portions 95, 96, and 97 are arranged at equal intervals in a straight line. Although this example is described herein, for simplicity of description, in the case that the number of laser devices is 3, the following holds regardless of the number of laser devices. Output beams 11, 12, and 13 (or 21, 22, and 23) of the laser devices have nearly equal wavelength and intensity. Moreover, the polarizing directions 114, 115, and 116 (or 214, 215, and 216) thereof are the same as an arrangement direction 119 in which the laser devices are arranged. Two such semiconductor laser light sources are used. Output beams 11, 12, and 13 (21, 22, and 23) of two such semiconductor laser light sources are combined into a bundle of composite beams. The surface of a photosensitive drum, which is an image recording medium, is scanned with the composite beams, which are collectively deflected and pass through a rotary polygon mirror and an FE) lens. Therefore, image information is written to the medium by performing parallel scanning thereof by simultaneously using beams, the number of which is the sum total of beams outputted from each of the laser light sources. The beams are separated on the surface of this drum from one another at intervals determined according to a print dot density. The beams are modulated in intensity independent of one another according to image signals.

Incidentally, it is necessary for realizing high picture quality of a printed image obtained by multibeam scanning that the intervals of the scanning positions of the beams are always at a set value. Thus, the stabilization of the interval between adjacent ones of the beams is achieved by providing a device for detecting the interval therebetween at a place in the vicinity of a scanning start edge and for correcting a shift from a set value when such a shift occurs. Furthermore, a countermeasure against a scanning beam position shift caused owing to a shift in relative position between the array light sources 1 and 2 is to draw out a part of light beams from each of the light sources and to stabilize the interval between the scanning positions of these beams at the set value.

The aforementioned means according to the present invention employs two array light sources each having a practically available number of devices mounted therein. Thus, as compared with the prior art apparatus having a single array type semiconductor laser, the number of scanning beams is doubled in the apparatus according to the present invention. Consequently, the processing speed is increased still more. Furthermore, high dpi setting is achieved.

Another object of the invention is to realize a multibeam scanning optical system enabled to detect the pitch or interval of scanning beams simultaneously with detection of each of the beams, and to always detect and correct the pitch of the scanning beams even during operations of a printer, and to maintain the pitch or interval of the scanning beams at a set value preferably for a high-speed laser printer that performs a long-duration continuous operation.

In a laser scanning optical system applied to a laser printer, usually, a photodetector for determining the timing, with which a scanning beam passes through a predetermined position, is placed near to the scanning start edge of a recording medium, such as a photosensitive drum. Meanwhile, output portions constituting an array light source are arranged at equal intervals. Further, the array light source is disposed in such a manner as to be inclined to the scanning direction so as to set the scanning pitch or interval on the scanning surface, which is a recording medium, at a value corresponding to the print dot density. At that time, all the time intervals between the moments at which the successive beams pass through the photodetector, respectively, are equal to one another and to a value that changes according to the inclination angle of the array light source. When the angle or direction of arrangement of the array light source changes, the interval between the scanning lines on the scanning surface varies. This results in variation in time interval between moments at which the successive beams pass through the photodetector, respectively. The interval between the scanning beams can be maintained at a constant value by detecting this variation in the time interval, and adjusting the direction of arrangement of the array light source according to this detection signal to thereby correct and control the time interval at a proper value. This is indispensable for realizing high picture quality of a printed image.

Further, the detection and correction can be performed at each scanning according to the invention, without interrupting a printing job. Moreover, even during an operation of a printer, the checking and correction can be always and continuously performed.

DETAILED DESCRIPTION OF THE PREFERRED EMBODIMENTS

Now, a description will be given in more detail of preferred embodiments of the invention with reference to the accompanying drawings.

Figure 1:
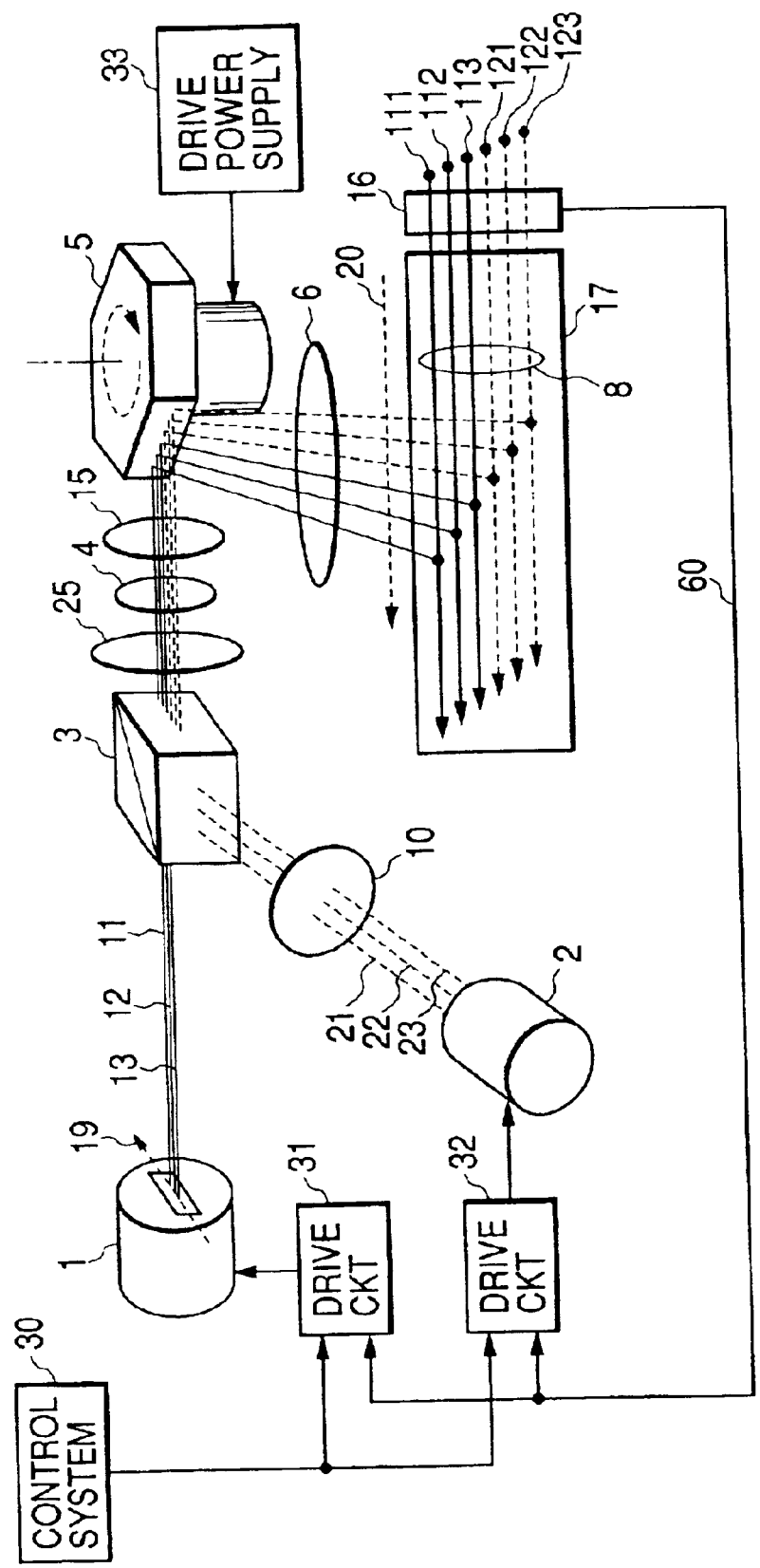
FIG. 1 is a schematic diagram illustrating an optical scanning apparatus that is an embodiment of the present invention.

FIG. 1 illustrates an embodiment of a multibeam scanning optical system of the present invention. This optical system comprises two laser light sources 1 and 2, into each of which a plurality of semiconductor laser devices enabled to be light-modulated are incorporated, a half-wave plate 10, disposed at an output-side of the light source 2, for causing the polarizing directions of output beams of these light sources to be orthogonal to each other, a polarizing prism 3, a first optical system 15 for shaping a bundle of composite beams 4, in to which the beam shaving passed through this polarizing prism 3 are combined, and for converging the composite beams onto a rotary polygon mirror 5 so that a linear image is formed thereon, the polygon mirror 5, and a scanning lens 6 for converging the composite beams 4 deflected by the rotary polygon mirror 5 onto the whole area of a predetermined scanning surface 17 in such a manner as to have a uniform beam diameter. A plurality of beams 111, 112, 113, 121, 122, and 123 are separated from one another at the interval, whose value is determined according to the print dot density, between adjacent ones of the beams. Further, a quarter-wave plate 25 disposed at the rear of the polarizing prism 3 is used for arranging the orthogonal polarizing directions of beams outputted from both the laser light sources and for maintaining the photoreflectance of each of the beams at an equal value.

Figure 2:
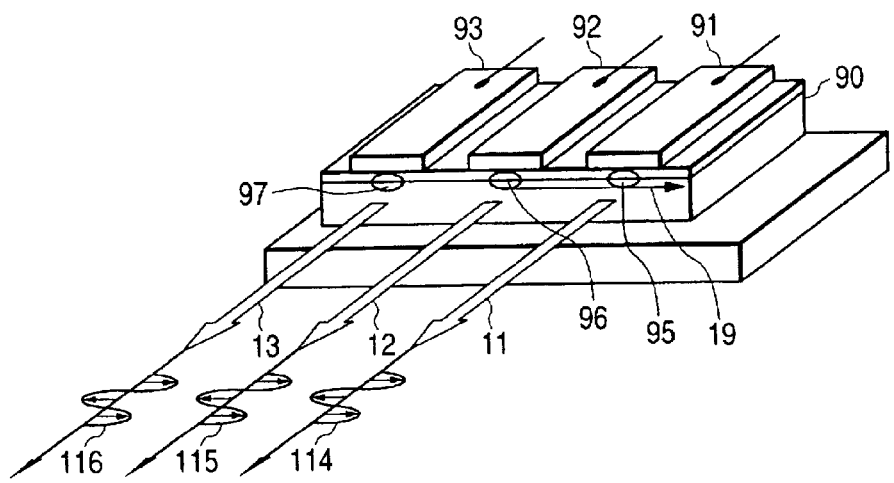
FIG. 2 is a schematic diagram illustrating the outline configuration of each of semiconductor laser array light sources.

Incidentally, as illustrated in FIG. 2, the laser light source 1 is configured so that semiconductor laser devices are arranged in a line at uniform intervals. The polarizing directions of output beams of each of the laser devices are parallel to an arrangement direction 19 in which the semiconductor laser devices are arranged. Drive circuits 31 and 32 are connected to the laser light sources 1 and 2, respectively.

Figure 3:
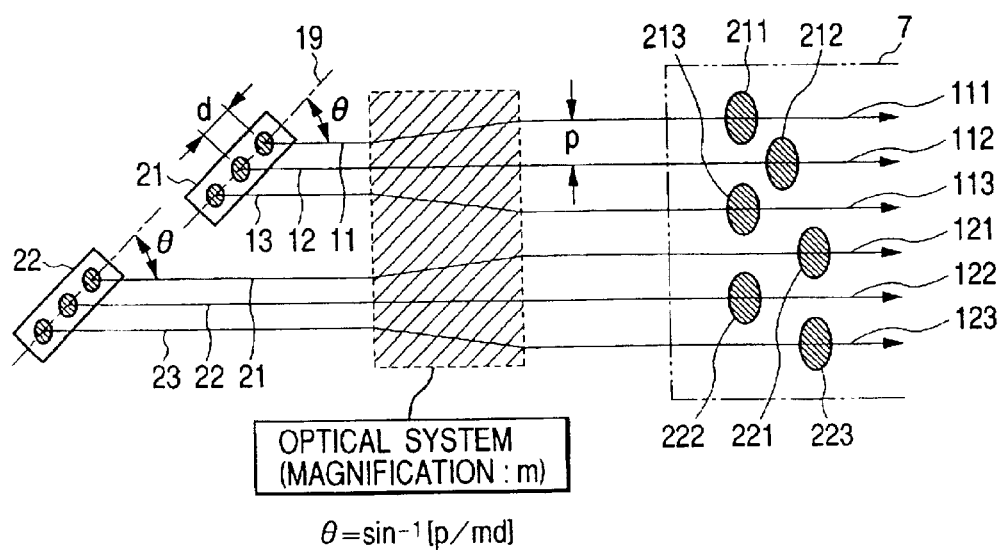
FIG. 3 is a schematic diagram illustrating the relation between a semiconductor laser device interval of each of the laser array light sources and a scanning beam interval.

The two laser light sources are arranged so that the arrangement direction 19 of the laser devices each of the laser light sources is inclined to the scanning direction of beams on the scanning surface 17 at a predetermined angle Θ. This angle is determined according to the interval between adjacent semiconductor laser devices of the laser light sources, the magnification of the optical system provided between the light source, and the predetermined interval between adjacent ones of beams on the scanning surface. FIG. 3 illustrates this relation thereamong. The inclination angle Θ between the arrangement direction 19, in which the laser devices are arranged, and the direction 20 along which the scanning lines corresponding to the beams extend, is given by the following equation (1)

$$\Theta = \sin^{-1}[p/md] \qquad (1)$$

where d is the interval between the adjacent semiconductor laser devices, and p is the predetermined interval between the adjacent ones of beams on the scanning surface, and m is the magnification of the optical system.

The output beams are combined into the composite beams 4 through the polarizing prism 3. Thus, the half-wave plate 10 is disposed at a side of the laser light source. The polarizing directions of the output beams of the laser light sources are made to be orthogonal to each other. The composite beams 4 are converted to the scanning beams 111, 112, 113, 121, 122, and 123 respectively corresponding to the output beams 11, 12, 13, 21, 22, and 23 of the laser light sources through the rotary polygon mirror 5, which is rotated at a constant speed by a drive power supply 33, and the scanning lens 6 including the FΘ lens. A photodetector 16 for detecting the position of the scanning beams is placed near to the scanning surface. Thus, the passing time of each of the scanning beams is detected therein. A detection signal 60 outputted therefrom is used as a synchronization signal. Then, the intensity of light outputted from each of the laser devices is modulated according to an image information signal outputted from the control system 30.

The multibeam scanning system using the two array laser light sources is configured as described above.

Figure 7:
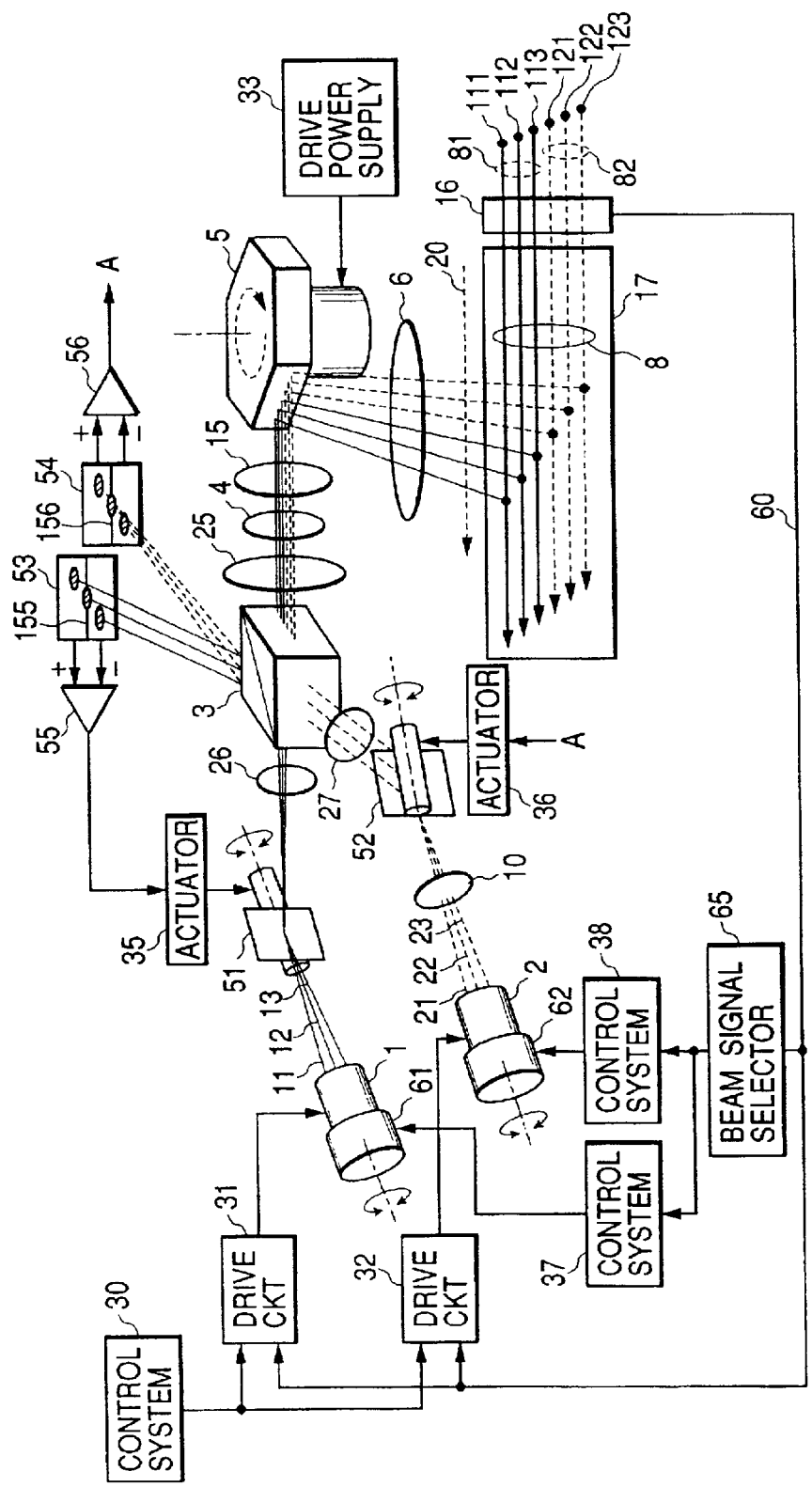
FIG. 7 is a schematic diagram illustrating an optical scanning apparatus that is another embodiment of the present invention.

Next, a description will be given of a method for stabilization of the interval between adjacent ones of the beams hereinbelow with reference to FIG. 7.

Causes of variation in the interval between the adjacent scanning lines on the photosensitive drum during use of the two array laser light sources are variation in the relative position between the laser light sources and in variation in the inclination angle between each of the light sources itself and the direction of the scanning line. Counter measures against the variation in the relative position between the light sources are as follows. Each of actuators 35 and 36 for adjusting the beam position in a direction perpendicular to the scanning direction is disposed on an optical path between the polarizing prism 3 and a corresponding one of the laser light sources 1 and 2. Moreover, to detect the relative position in the direction perpendicular to the scanning direction of an output beam of each of the laser light sources, what are called divided type photodetectors 53 and 54 fixed to the same substrate are placed. A part of optical energy outputted from the light sources is extracted therefrom as monitoring light, with which the photodetectors 53 and 54 are irradiated. At that time, a part of energy of luminous flux of the whole output beams of each of the laser light sources can be utilized as the monitoring light. Alternatively, a part of optical energy of a selected specific beam of each of the laser light sources can be utilized as the monitoring light.

Each of the photodetectors 53 and 54 is of the type that is divided in two sections along a corresponding one of the centerlines 155 and 156 in such a manner as to be able to detect the difference therebetween. A differential electric signal obtained by irradiating the photodetector with the monitoring light is controlled in such a way as to drive the actuators 51 and 52 through differential amplifiers 55 and 56 and actuator drive systems 35 and 36 and to always maintain the positions of the monitoring beams on the centerlines 155 and 156 of the photodetectors 53 and 54. The quantity of the monitoring light is adjusted by controlling other waveplates 26 and 27. Moreover, the interval between the centerlines 155 and 156 can be made to correspond to the interval between the scanning beams 112 and 122, or 111 and 121, or 113 and 123 from each of the laser light sources by maintaining the optical conjugate relationship among the photodetectors 53 and 54 and the scanning surface 17 (an optical system provided in front of each of the photodetectors is not shown). Further, galvano mirrors or oscillating mirrors can be used as the actuators 35 and 36.

The extraction and control of the beam position detecting signal are performed simultaneously with emission of beams, with which another photo detector 16 is irradiated, for detecting a beam scanning start time and by holding this state during a scanning period. This enables the controlling and holding of the relative positions in the direction perpendicular to the scanning direction of beams outputted from the two laser light sources at a set interval.

Figure 4:
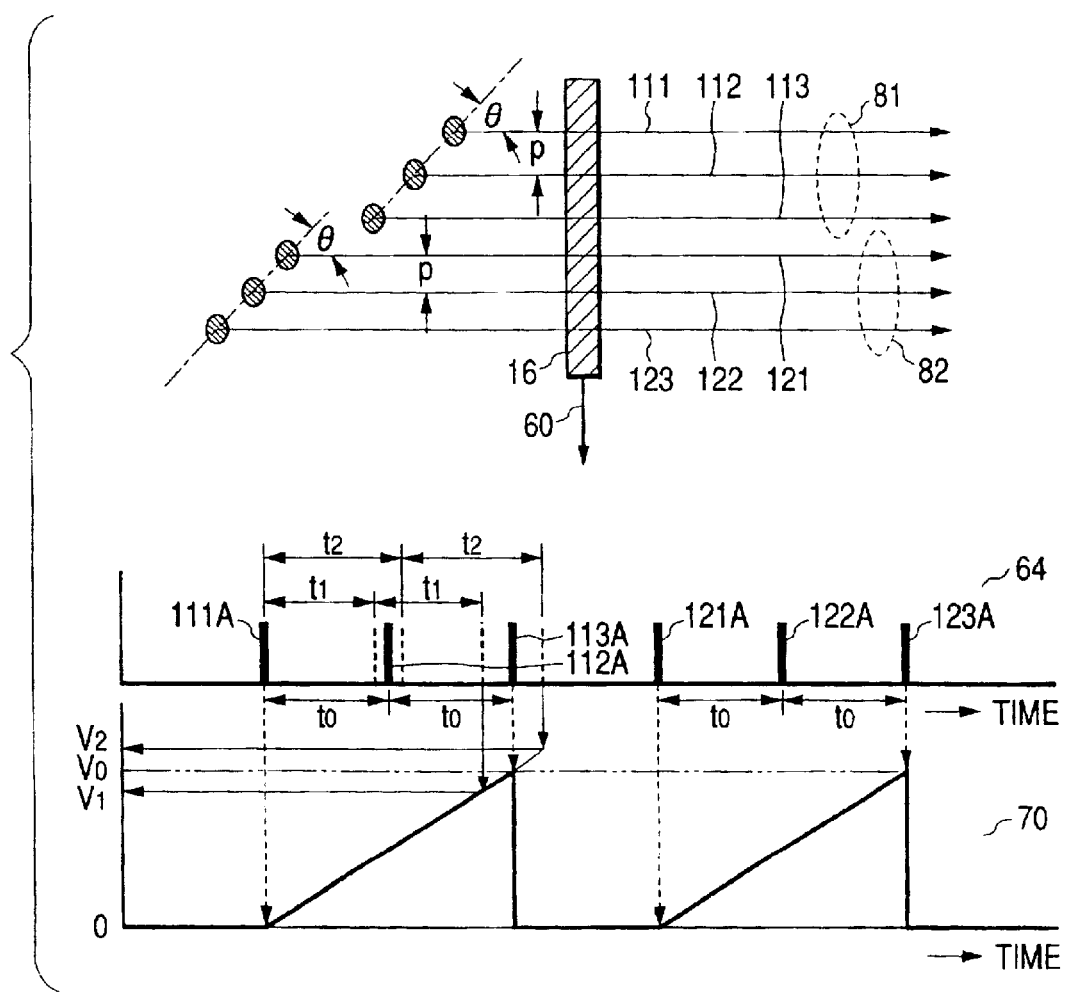
FIG. 4 is a schematic diagram illustrating an inclination correcting principle for each of the semiconductor laser array light sources.

The countermeasures against the variation in the inclination angle Θ of the laser light source, which is another cause for varying the interval between the scanning beams, are as follows. As illustrated in FIG. 4, it is assumed to pay attention to specific two beams, for instance, 111 and 113 of a group 81 (or 82) of the scanning beams corresponding to each of the laser light sources. The time interval T between moments, at which beams pass through the photodetector 16 for detecting the scanning start time, is given by the following equation (2):

$$T = 2p\cos[\Theta]/v = 2md\cos[\Theta]/v \qquad (2)$$

where p is the interval between the scanning lines, and v is the scanning speed, and Θ is the inclination angle.

Figure 5:
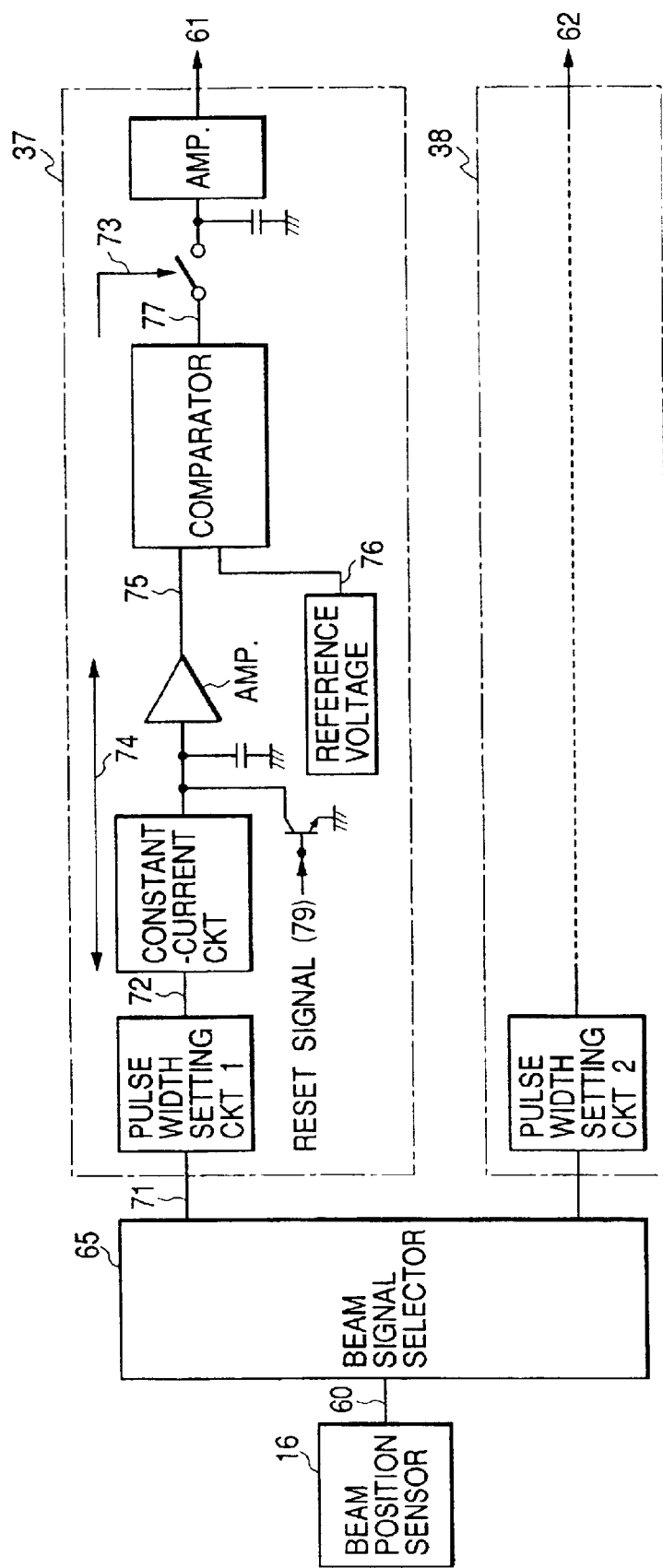
FIG. 5 is a circuit diagram illustrating the configuration of an inclination correcting circuit for correcting the inclination of each of the semiconductor laser array light sources.
Figure 6:
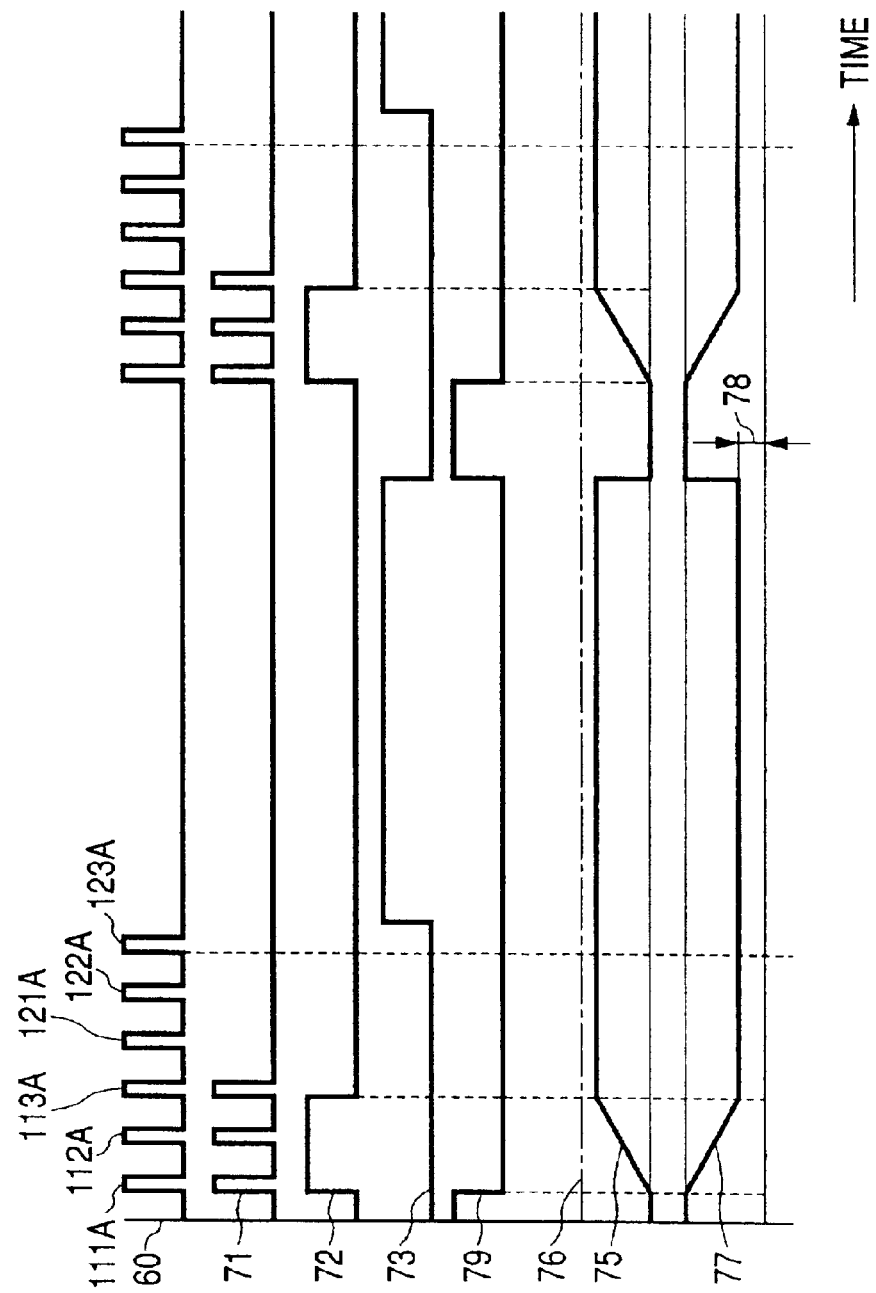
FIG. 6 is a time chart illustrating signals flowing through the inclination correcting circuit of the present invention.

A shift in the time interval from a predetermined value $T_0 = 2$ to ($t_0$ is the time interval between moments at which adjacent beams pass therethrough, respectively) is detected. Then, the stabilization control of the inclination angle of the laser light source is performed in such a manner as not to generate this shift. FIG. 4 also illustrates the waveform 64 of the detection signal 60 outputted fro the photodetector 16 and the waveform 70 of a signal representing a voltage value into which the time interval between such signals. In this figure, $V_0$ is a voltage signal corresponding to a reference time interval $T_0$, and $T_1$, is a time interval in the case that the inclination angle of the laser light source is large, and $V_1$ is a voltage signal at that time ($T_2$ and $V_2$ correspond to the case that the inclination angle of the laser light source is small). The light detection signal 60 is discriminated by a beam signal selector 65 correspondingly to the groups 81 and 82 and inputted to control systems 37 and 38 respectively used for driving rotation actuators 61 and 62 annexed to the laser light sources. FIGS. 5 and 6 illustrate the circuit configurations of the control systems 37 and 38 and a time chart in such a case. A time interval 72 between the moments, at which the two beams in question attention pass therethrough, is determined according to a beam signal 71 outputted from the laser light source 1 among all the beam signals 11A to 123A. A voltage V75, to which a capacitor is charged during this time 72, is obtained by a sampling circuit 74. The value of this voltage corresponds to the time during which the beam receiving attention passes through the photodetector. The rotation actuator 61 is driven according to a differential output signal 77 representing the difference between this voltage and the reference voltage $V_0$ 76 corresponding to the set passage time. A control operation is performed so that the signal level of the differential output signal 77 becomes zero. This state is maintained during a holding period 73. A signal 79 is a reset signal. The aforementioned sampling/holding operations can be repeated at each scanning or at each suitable number of times of scanning. Similarly, this holds even in the case of the drive system 38 for the rotation actuator 62.

With the aforementioned configuration of the optical system, the interval between adjacent scanning beams in a scanning plane can be always maintained at a predetermined value when simultaneous and parallel scanning is performed by using a plurality of output beams of two independent array laser light sources. Thus, high-speed and high-precision laser beam writing can be achieved.

Incidentally, in the foregoing description, each of the laser light sources including three laser devices have been described. The invention can be applied to all apparatuses each having array laser light sources, each of which includes two or more laser devices.

Figure 8:
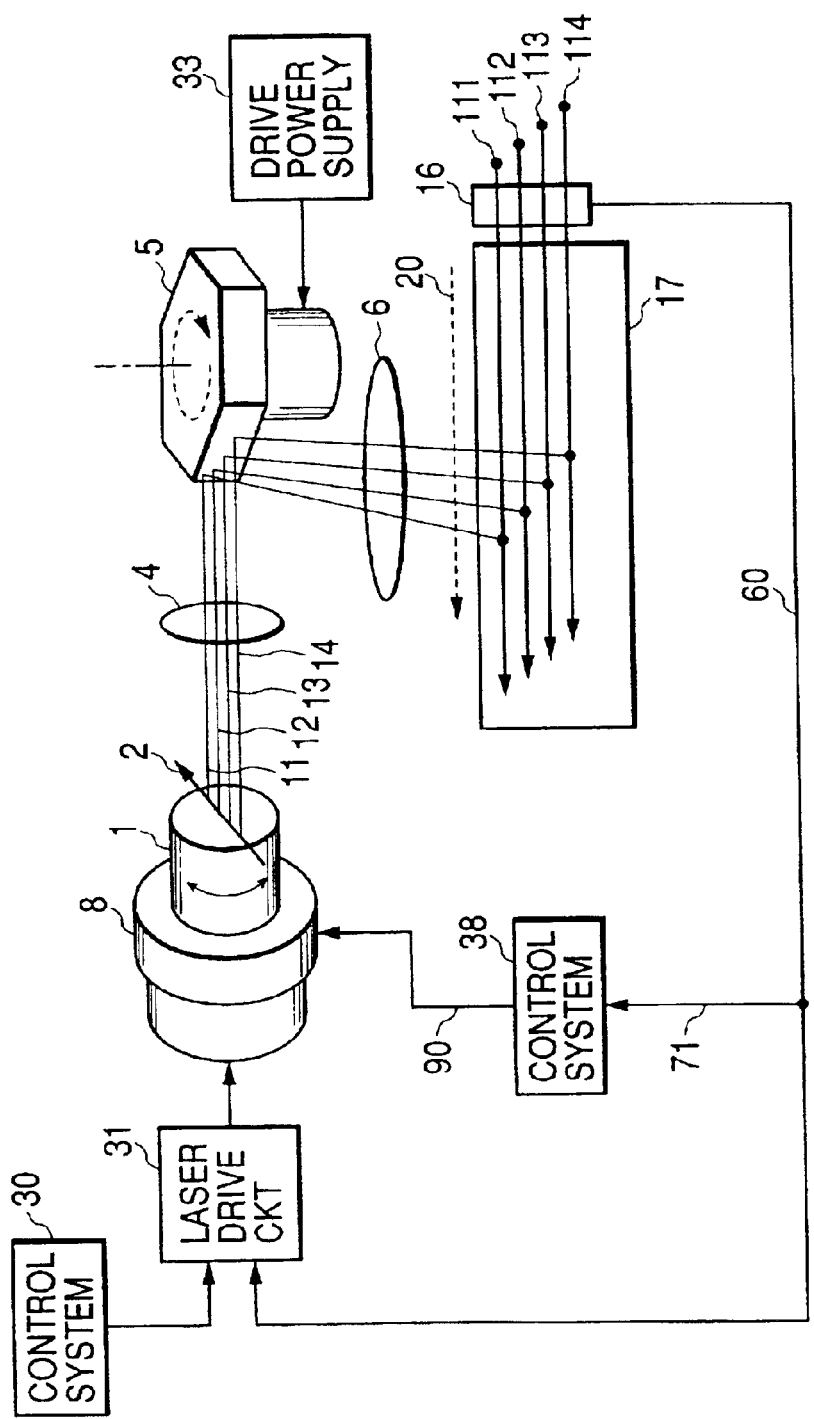
FIG. 8 is a schematic diagram illustrating a beam scanning apparatus that is still another embodiment of the present invention.
Figure 9:
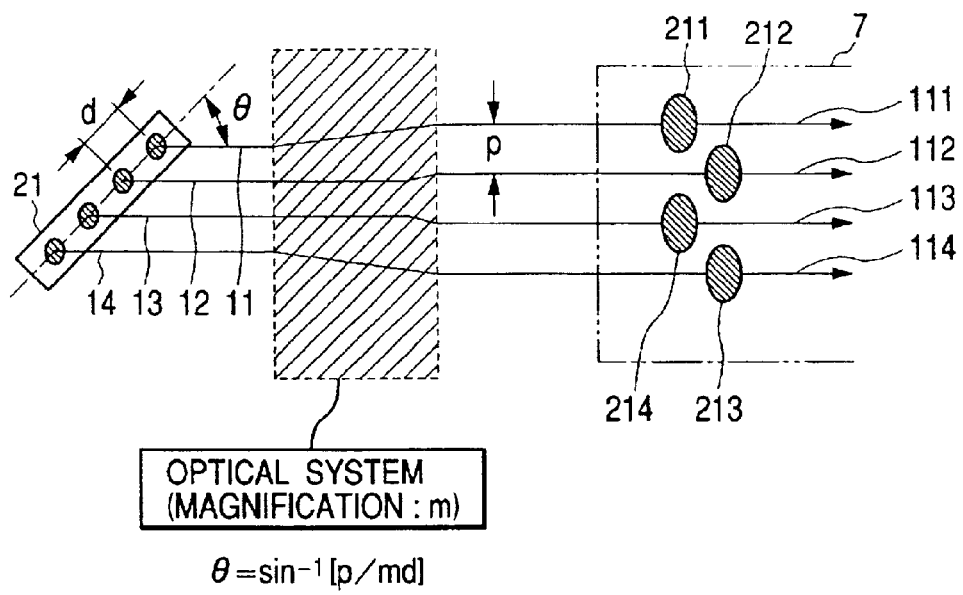
FIG. 9 is a schematic diagram illustrating the relation between a semiconductor laser device interval of each of array light sources and a scanning beam interval.

FIG. 8 shows still another embodiment of the present invention. A laser array light source 1 has a plurality of semiconductor laser devices (4 laser devices in this embodiment) that can be light-modulated and are arranged at equal distances and incorporated thereinto. Light emitting portions are arranged at equal intervals therein in a line extending in a predetermined direction 2. A plurality of output beams 11, 12, 13 and 14 outputted from this light source pass through a first optical system 4, a rotary polygon mirror 5, and a scanning lens 6 and become converging beams 111, 112, 113, and 114 of a predetermined equal spot diameter on a scanning surface 17. These beams are applied to the simultaneous and parallel scanning performed at equal intervals. A photodetector 16 for determining a scanning start time of each of the beams is disposed near to the edge portion of the scanning surface 7. The intensity of a plurality of the beams 111, 112, 113 and 114 is performed according to a signal representing image information, which is outputted from a control system 30, through a laser drive circuit system 31 in synchronization with a detection signal 60 outputted from the photodetector 16. The control system 30 receives image information from a computer (not shown). Incidentally, to set the interval between the adjacent scanning beams on the scanning surface 17 at a value corresponding to the print dot density, the laser light source 1 is placed so that the direction 2 of arrangement of the light emitting portion thereof is inclined to a beam scanning direction 20 at a proper angle Θ. FIG. 9 illustrates this relation thereamong. This angle Θ is given by the following equation (3):

$$\Theta = \sin^{-1}[p/md] \quad (3)$$

where d is the interval of the arrangement of the light emitting portions of a light source 21, and p is the scanning beam interval, which is the interval between the central portion of the adjacent ones of beams 211, 212, 213, and 214 of an equal spot diameter on the scanning surface, and m is the magnification.

Figure 10:
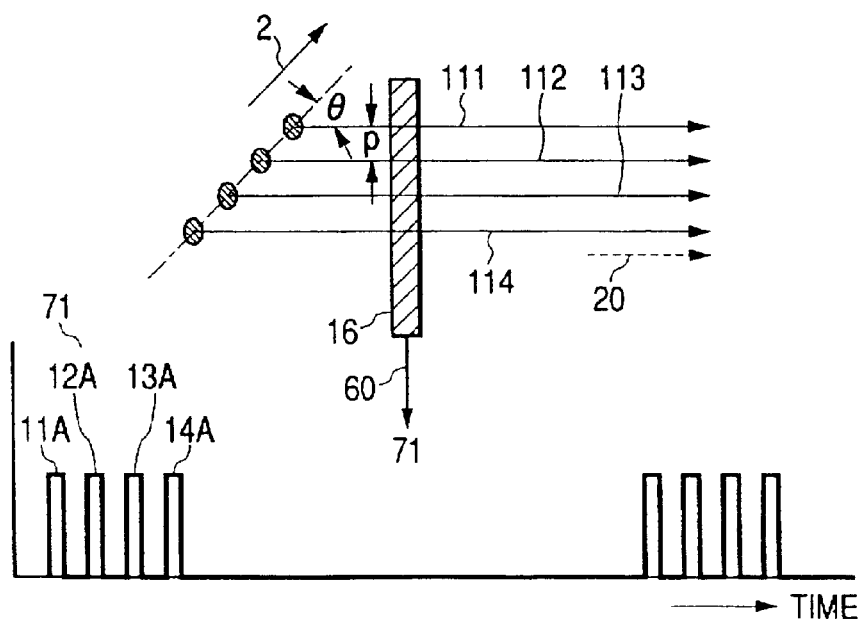
FIG. 10 is a schematic diagram illustrating the waveforms of a plurality of scanning beam signals outputted from a photodetector.

The scanning beam detection signal 60 outputted from the photodetector 16 at that time has the waveform illustrated in FIG. 10. Thus, signals 11A, 12A, 13A, and 14A respectively corresponding to the beams are obtained.

Incidentally, when the inclination angle Θ of the laser light source 1 changes, the interval p between the scanning lines on the scanning surface varies. This results in degradation in the written image information. Meanwhile, the time interval t between the moments at which, for instance, a first beam 111 and a second beam 112 pass through the photodetector 16, respectively, is given by:

$$t = p\cos[\Theta]/v = md\cos[\Theta]/v \quad (4)$$

where v is a beam scanning speed. The time interval between the moments, at which the two beams in question pass through the photodetector 16, respectively, corresponds to the interval between these two beams, that is, the inclination angle of the array light source. Furthermore, when paying attention to the first and fourth beams, the time interval is given by:

$$t = 3md\cos[\Theta]/v \quad (5)$$

Figure 11:
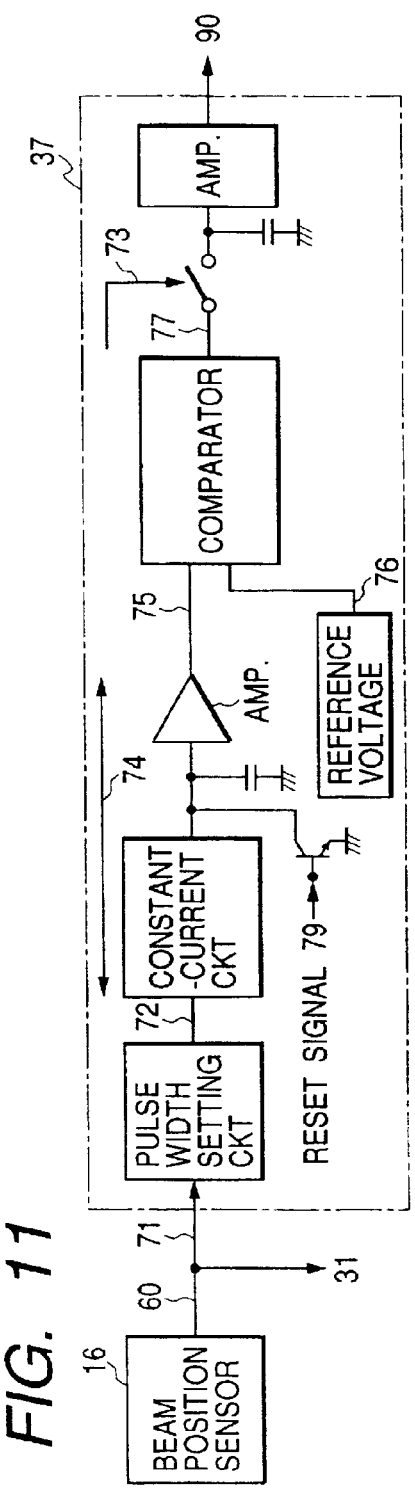
FIG. 11 is a circuit diagram illustrating the configuration of an inclination correcting circuit for correcting the inclination of each of the array light sources.
Figure 12:
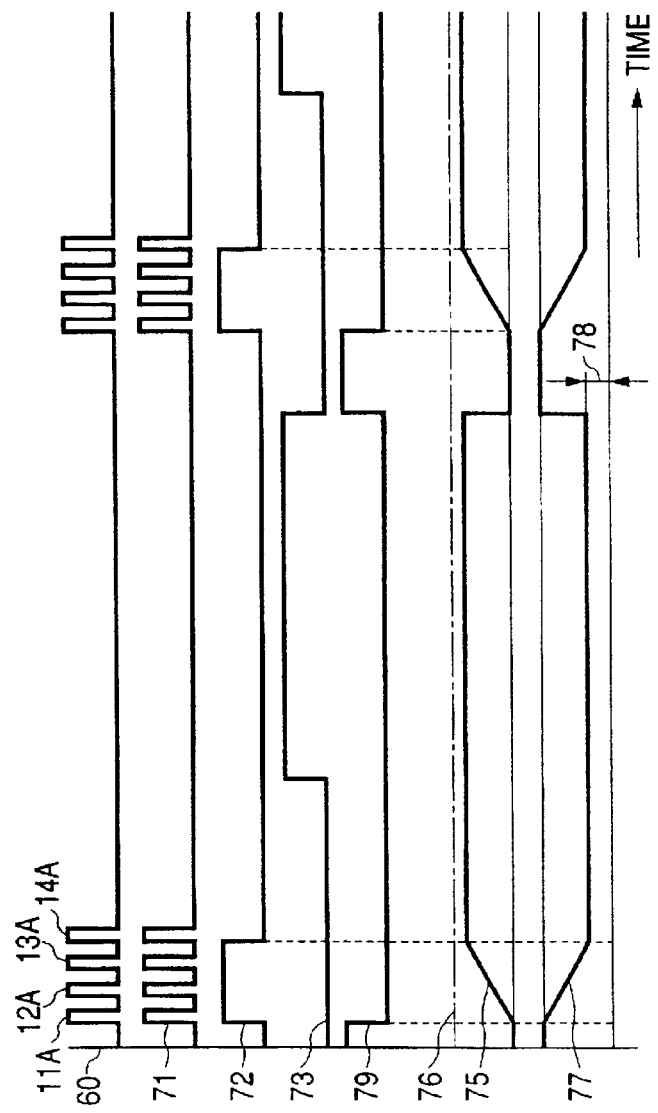
FIG. 12 is a time chart illustrating signals flowing through the inclination correcting circuit of the present invention.

First, a shift between a set value corresponding to the print dot density and the time interval is detected. Then, a rotation control operation is performed on the laser light source 1 in such a manner to eliminate the detected shift, so that the interval between the adjacent beam scanning lines is maintained at a constant value. FIGS. 11 and 12 illustrate the circuit configuration of the control system for performing such a control operation, and a time chart illustrating signals flowing therethrough, respectively. In this embodiment, among the plurality of beams, variation of the interval between a moment, at which the beam first passes through the photodetector 16, and the moment at which the beam passes therethrough last, from the set value is detected. Then, a control operation is performed so that this time interval has a proper value.

The detection signal 60 outputted from the photodetector 16 is inputted to the drive control portion 38 of a laser light source rotating mechanism portion 8. A pulse width 72 corresponding to the passage time between the beams in question is determined from the signal waveform 71 at that time by a pulse width setting circuit. Then, a voltage V 75, to which the capacitor is charged, within the time 72 is obtained by the sampling circuit 74. This value of the voltage corresponds to the passage time 72 of the beam in question. The laser light source rotating mechanism portion 8 is driven according to a signal 90 obtained by amplifying a difference output signal 77 representing the difference between the voltage 75 and the reference voltage $V_0$ corresponding to a normal passage time, so that the level of the difference output signal 77 becomes zero 78. This state is maintained all through a holding period 73. The sampling/holding operation can be repeated at each scanning or at each suitable number of times of scanning by utilizing the reset signal 79. Incidentally, the reference voltage $V_0$ 76 may be generated by an electric circuit. Alternatively, the reference voltage may be digitally set.

Figure 13:
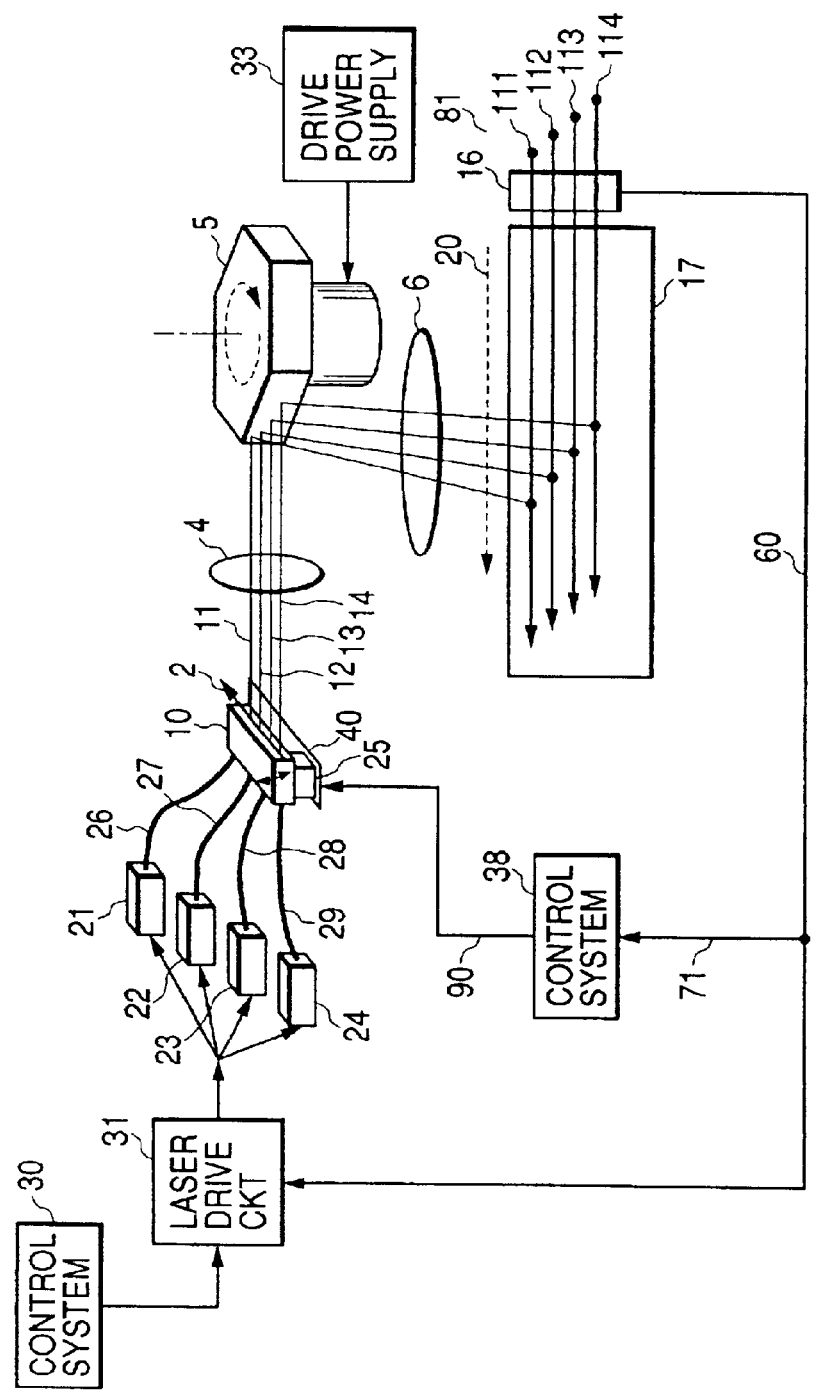
FIG. 13 is a schematic diagram illustrating still another embodiment of the present invention.

FIG. 13 illustrates yet still another embodiment. Optical fibers 26, 27, 28, and 29 are connected to output ports of the individual semiconductor lasers 21, 22, 23 and 24. Then, the output end surfaces thereof are made to adjoin and arranged in a straight line. This embodiment corresponds to the case that an output end array light source 10 formed in this manner is used. In this case, when the inclination angle of the output end surface varies, the interval between the scanning lines changes in the aforementioned manner. Thus, an end of the output end array light source portion 10 is flexibly fixed to a substrate surface 40. An adjusting actuator 25 is placed in the proximity of the other end thereof. For example, a piezoelectric device, which can be expanded and contracted by an electric signal, may be applied to such an actuator. As already described in the description of the aforementioned embodiment, the passage time between the two beams in question is detected, and the adjusting actuator 25 is driven by a difference signal output 90 representing the difference between this passage time and the set value, so that the difference output becomes zero. In the case of using a piezoelectric device as the adjusting actuator 25, the inclination angle of the output end array light source portion 10 can be adjusted by utilizing the expansion or contraction of this device. Thus, the adjustment and stabilization control of the inclination angle of the output end array light source portion 10 with respect to the beam scanning direction is enabled. Consequently, the interval between adjacent ones of scanning lines respectively corresponding to a plurality of beams can be maintained at an equal value.

In the foregoing description, the apparatus having the array light source, which includes four light emitting portions, has been described. As long as the array light source has two or more light emitting portions, the invention may be applied to either a straight-line-like array light source or a two-dimensional array light source.

Further, in the foregoing description, it has been described that the scanning spot arrangement is inclined to the scanning direction. However, needless to say, the invention can be applied to the case that the scanning spot arrangement is perpendicular to the scanning direction and that the set value is 0.

With the optical configuration, when parallel scanning is performed by simultaneously using a plurality of output beams of an array light source, which are arranged at specific intervals, the inclination angle of the array light source can be corrected so that the interval between the scanning beams on the scanning surface is stably maintained. Consequently, high-speed and high-accuracy laser beam writing can be achieved.

Furthermore, the invention enables the apparatus to always and simultaneously perform both the checking and correction of the interval between the scanning beams at each beam scanning.

As was described above, the invention enables multibeam scanning optical system simultaneously using two semiconductor laser array light sources, each of which can emit a plurality of beams, to perform stabilization control of the interval between adjacent scanning beams so that the interval therebetween stably has a predetermined value. Consequently, high-speed and high print dot density writing can be realized with high accuracy. Moreover, this is useful for realizing a high-speed and high-print-quality laser printer.

Also, the invention enables a beam scanning apparatus to always and continuously correct and control variation in the interval between adjacent ones of the scanning lines on the scanning surface, which is caused owing to a shift in the position of the array light source in the multibeam scanning optical system using the array light source that can output a plurality of beams. Consequently, high-speed and high-accuracy laser scanning writing is achieved. This contributes to the realization of a high quality image in a high-speed printer.

What is claimed is:

1. An optical scanning apparatus adapted to perform parallel scanning with a plurality of beams on an image recording medium at predetermined pitches, said apparatus comprising:

two semiconductor laser light sources each including a plurality of light emitting devices arranged in a line at equal intervals;

a beam scanner;

a beam converging unit disposed between the laser light sources and the beam scanner for converging the light beams onto the surface of the beam scanner; and a controller for individually controlling an inclination angle of an arrangement direction of said light emitting devices of each of said semiconductor laser light sources with respect to a beam scanning direction, wherein said inclination angle of each of said semiconductor laser light sources is detected and controlled so that all beam intervals on a scanning surface are kept in a predetermined equal value, during recording operation.

2. The optical scanning apparatus according to claim 1, wherein said controller includes a detecting means for detecting a shift in time interval between moments, at which at least two reference beams from each of said light sources pass a photo-detector provided in the vicinity of a beam scanning start position, and adjusting means for adjusting the inclination angle for each of said light sources respectively, depending on said shift in time interval.

3. An optical scanning apparatus adapted to perform parallel scanning with a plurality of beams on an image recording medium, said apparatus comprising:

two semiconductor laser light sources each including a plurality of light emitting devices arranged in a line at equal intervals;

a beam scanner;

a beam converging unit disposed between the laser light sources and the beam scanner for converging the light beams onto the surface of the beam scanner; and a controller for controlling a beam interval in the perpendicular direction to a beam scanning direction between scanning beams out of said laser light sources respectively, wherein said controller comprises detecting means for detecting scanning positions of a reference beam specified respectively from output beams out of each of said laser light sources, and keeping means for keeping the beam interval between said reference beams in a predetermined value, during recording operation.

4. An optical scanning apparatus adapted to perform simultaneous parallel scanning with a plurality of beams on an image recording medium at predetermined pitches, said apparatus comprising:

two semiconductor laser light sources each including a plurality of light emitting devices arranged in a line at equal intervals;

a beam scanner;

a beam converging unit for converging the light beams onto reflective surfaces of the beam scanner; and a controller both for individually controlling an inclination angle of an arrangement direction of said light emitting devices in said semiconductor laser light sources with respect to a beam scanning direction and for controlling a relative beam interval distance in the perpendicular direction to the beam scanning direction between reference beams specified respectively from each of said laser light sources, so that all scanning beam intervals on said recording medium are kept equally in a predetermined value, during recording operations.

5. An optical scanning apparatus comprising:

a first semiconductor light source including a plurality of light emitting devices arranged in a line at equal intervals;

a second semiconductor light source including a plurality of light emitting devices arranged in a line at equal intervals;

a first controller for individually controlling an inclination angle of an a arrangement direction of said light emitting devices with respect to a beam scanning direction of the first and the second semiconductor light sources respectively so that an interval between scanning portions from each of said semiconductor light sources on a scanning surface becomes a predetermined interval between scanning beams; and a second controller for controlling a relative interval distance between beams specified respectively from the first semiconductor light source and the second semiconductor light source, so that said interval distance between said beams specified on a scanning surface becomes the predetermined value or a multiple of the predetermined value.

6. The optical scanning apparatus according to claim 5, wherein all intervals of scanning beams on a recording medium formed by output beams from light emitting devices of both the first semiconductor light source and the second semiconductor light source are equal to each other.

* * * * *